Oct. 28, 1958  B. M. SKAINS  2,857,706
TROT LINE SETTER
Filed Sept. 19, 1955

INVENTOR
B. M. SKAINS

BY 
ATTORNEY

United States Patent Office 2,857,706
Patented Oct. 28, 1958

2,857,706

TROT LINE SETTER

Bruce M. Skains, Waco, Tex.

Application September 19, 1955, Serial No. 535,134

6 Claims. (Cl. 43—57.5)

This invention relates to the catching of fish and more particularly to improved equipment intended for use by commercial and other fishermen in the practice of their trade.

This invention relates specifically to an improved trot line setter that will provide for an orderly storage of the line during periods of non-use and which can be mounted on the side of a boat for easy dispensing of the line during the disposition of the same in the water in order to catch fish.

Heretofore, trot line setters have been devised which have not been satisfactory because of a number of reasons including their tendency to permit the line to tangle during periods of storage or dispensing of the line, not permitting the line to dry thoroughly when stored, failure to hold enough hooks, as well as having too much bulk, being expensive and impractical and for various other reasons.

It is an object of this invention to produce a trot line setter that will overcome the previously enumerated disadvantages and will offer an orderly and satisfactory storage and dispensing of the trot line without causing its user to be concerned with unnecessary tangling of the line and snagging of the hooks, or the causing of injury due to engagement of the points of the hooks with portions of the clothing or the body.

Another object of the invention is to provide a trot line setter that will hold a large amount of lines and hooks in a unit that will have little bulk and will be practical and inexpensive to manufacture.

A further object of the invention is to provide a trot line setter upon which a trot line can be stored while in a wet condition on the setter and which thereafter will quickly and thoroughly dry so that the line will not suffer from rotting due to dampness.

Figure 1:
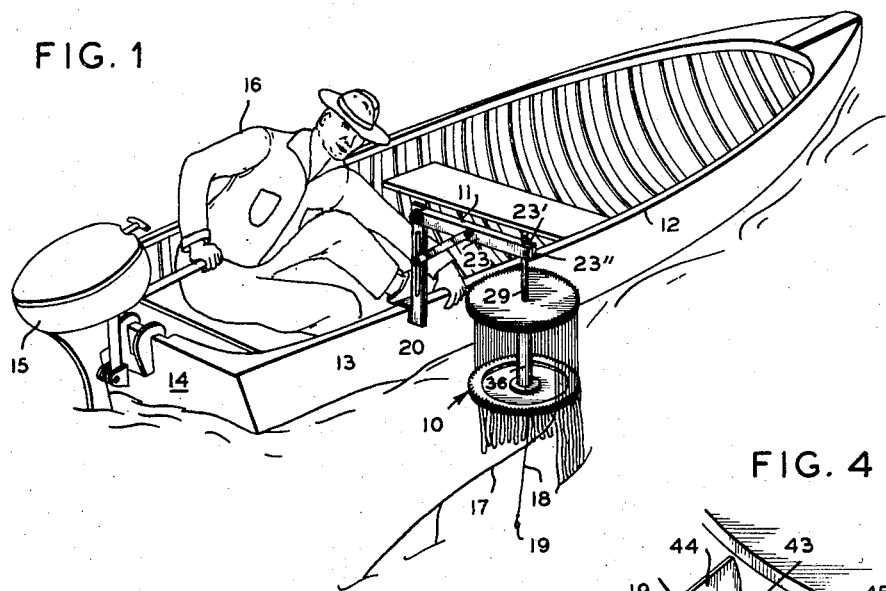
Figure 4:
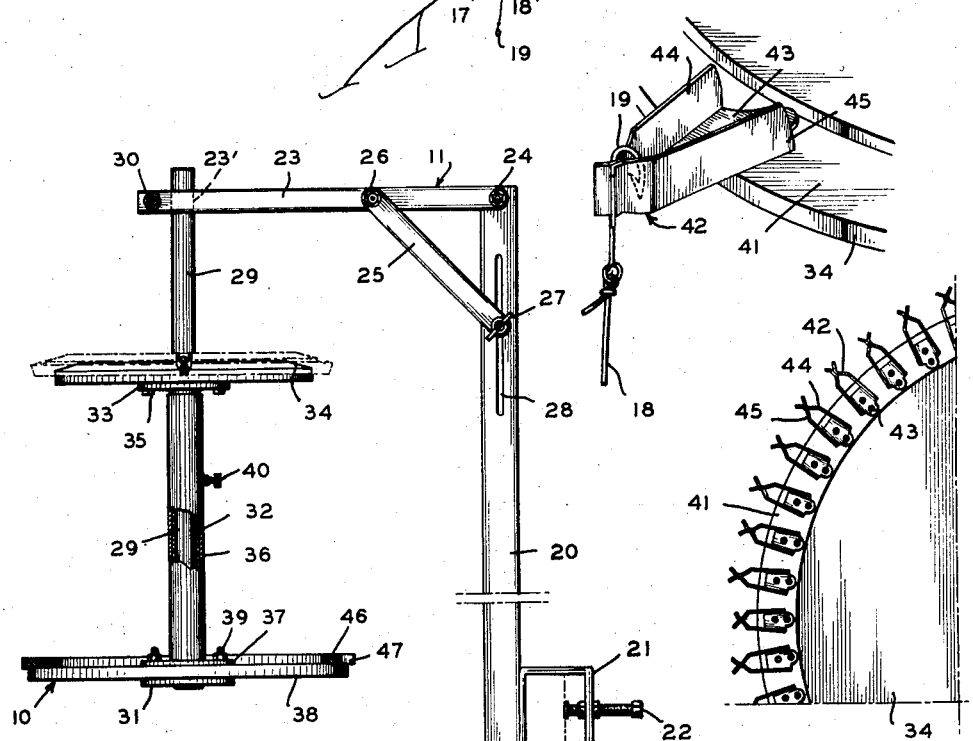
Figures 2, 3:

Other objects and advantages of the invention will be apparent from the following description taken in conjunction with the accompanying drawing wherein:

Fig. 1 is a perspective view illustrating the invention mounted on the side of a boat in a manner for setting a trot line;

Fig. 2, an elevation view of the trot line setter with portions cut away to show sections of the sleeves and the rubber ring;

Fig. 3, a plan view on an enlarged scale of a portion of the upper disk including the spring retaining clips; and Fig. 4, an enlarged perspective view of one of the spring clips with a hook engaged thereover.

Briefly stated, applicant's invention comprises a trot line setter adapted to be suspended from a bracket having an outwardly extending arm designed to be attached to the side of a boat, the trot line setter having a shaft suspended from the outwardly extending arm and having an abutting flange at its lower end. A sleeve is rotatably mounted upon the shaft and has a disk attached at its upper end which disk carries a series of spring clips for suspending hooks therefrom and a second sleeve is slidably mounted about the first sleeve, the second sleeve having a disk attached at its lower end.

The lower disk carries a slotted rubber ring which extends outwardly from its periphery, the slots being adapted to hold the leaders of a trot line while the hooks are suspended from the clips of the upper disk, the two disks being adjustable along said shaft in relation to each other to accommodate different length leaders.

With reference to Fig. 1 a trot line setter 10 is illustrated as suspended from a bracket 11 clamped to the gunnel 12 of a boat 13 having a stern 14 on which is mounted a conventional outboard motor 15 to drive the boat. The motor is operated by a fisherman 16 while dispensing or setting the trot line 17 in fishing position in the water. The trot line 17 has a plurality of leaders 18 attached thereto and extending therefrom at spaced intervals, each leader having a conventional fishing hook 19 with bait for attracting the fish. It should be understood that the bracket 11 can be mounted on either sides or the stern of the boat.

As shown in Fig. 2 the bracket 11, which carries the trot line setter 10, has a vertically extending arm 20 with a conventional inverted U-shaped clamping bracket 21 at its lower end. The clamping bracket 21 has a clamping bolt 22 adapted to be secured against the inside of the gunnel 12 of the boat. A horizontally and outwardly extending arm 23 is pivotally mounted to the upper end of the vertically extending arm 20 by a conventional pivot bolt 24 and is supported in the outwardly extending position by a link 25 which is pivotally mounted to the horizontal arm 23 by a pivot bolt 26. The lower end of the link 25 is held by a bolt and wing nut 27 sliding in a slot 28 in the vertically extending arm 20. The adjustable link 25 can be moved up or down within slot 28 for supporting the outwardly extending arm 23 in a plurality of separate angular positions in relation to the vertically extending arm 20.

With further reference to Fig. 2, the trot line setter 10 consists of a downwardly extending shaft 29 adjustably suspended from the outer end of the outwardly extending arm 23, the latter having an opening 23' for accommodating the shaft 29, the outer end of the arm 23 having a slot 23" extending to the opening 23' and being adapted to receive a bolt 30 for adjustably binding the bifurcated portions together for clamping the shaft 29 therein, this construction permitting the shaft 29 to be secured to the arm 23 at any desired elevation along its length.

The shaft 29 carries an outwardly extending flange 31 at its lower end for abutting and supporting the rotating members. An inner sleeve 32 is freely mounted on the shaft 29 and has an outwardly extending flange 33 at its upper end to which is concentrically attached a disk 34. Conventional fastening means such as welding or bolts 35 can be used to fasten the disk 34 on the flange 33.

A second sleeve 36 is slidably mounted over the first sleeve 32 and carries an outwardly extending flange 37 at its lower end. A disk 38 is attached to the flange 37 by conventional means such as the bolts 39 illustrated. The second or outer sleeve 36 has a set screw 40 threadably mounted intermediate its ends for tightening against the first sleeve 32 to hold the two sleeves fixed relative to each other. The sleeve 32 can be adjusted upwardly along shaft 29 in relation to sleeve 36 by the use of the set screw 40.

The upper disk 34 has a bevelled portion 41 around the upper edge of its periphery. A plurality of spring clips 42 are radially and outwardly mounted on the bevelled portion 41 for holding the hooks 19 in position to dispense the same. The spring clips 42 comprise a lower web portion 43 which has openings for accommodating fasteners to mount the spring clips on the bevelled portion 41.

On each side of the web 43 are two upwardly and outwardly extending spring arms or jaws 44 and 45 which are curved outwardly and oppositely adjacent their outer ends and are resiliently held together along a portion of the curved outer ends.

The lower disk 38 carries an outer rubber ring 46 along the upper edge of its periphery. The ring 46 has a plurality of slots 47 formed therein, the number of slots corresponding to the number of clips 42 carried by the upper disk 34. The slotted portion of the rubber ring 46 extends beyond the periphery of the lower disk 38 and is adapted to resiliently hold the lower ends of the leaders 18 of the trot line 17.

The trot line 17 is mounted on the trot line setter 10 by first suspending the hook 19 from a clip 42 and then inserting the lower end of the corresponding leader 18 in a slot 47 lying directly under the spring clip 42. It is assumed that the upper disk 34 has been adjusted in relation to the lower disk 38 by the use of the set screw 40 to accommodate the specific length of the leader 18 being used. It should be noted that the hook 19 is hung on either side of the spring jaws 44 and 45 with the point of the hook lying between the spring jaws. In this way the hooks 19 will not be discharged from the spring clip 42 until the line is being set. The spring clips are mounted on the bevelled portion 41 of the upper disk 34 for more readily discharging the hooks from the spring clips. The spring jaws 44 and 45 of the spring clips 42 are adjusted to have enough tension to keep the slack out of the trot line as it is being laid out from the trot line setter.

The trot line setter is used by first tying the outer end of the trot line to a sinker, a heavy weight or a fixed object within the fishing area. The boat is then moved across the fishing area along a desired course and the trot line 17 is pulled from the trot line setter 10, the trot line setter 10 slowly rotating on the shaft 29 as the line is laid out.

The applicant's trot line setter can be made in any desirable dimensions to accommodate the desired number of hooks. Applicant proposes a trot line setter with 100 spring clips 42 spaced around the upper periphery of the disk 34, but this number can be varied to suit the individual needs. Of course, if the trot line setter 10 has 100 spring clips 42, it will accommodate a trot line having 100 leaders and hooks spaced along its length. The trot line setter 10 and bracket 11 can be manufactured from corrosive resistant materials such as aluminum, stainless steel, plastics and the like.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A trot line setter comprising a bracket adapted to be mounted on a boat and having an outwardly extending arm, a shaft depending from said arm and having an enlarged portion at its lower end, a first sleeve freely mounted on said shaft and having a first disk concentrically mounted on its upper end, a second sleeve freely mounted over said first sleeve and having a second disk concentrically mounted on its lower end, said second disk resting on said enlarged portion, adjustable means for making said first sleeve rigid with said second sleeve, said first disk having a plurality of radially and outwardly directed spring clips along its periphery, said second disk having thereon a concentrically mounted ring of rubber provided with a plurality of radially and outwardly directed slits therein for holding the lower end of a fishing leader while the upper end of the leader is attached to a hook suspended from one of the spring clips on said first disk.

2. A trot line setter comprising a bracket adapted to be mounted on a boat and having an outwardly extending arm, a shaft depending from said arm and having an enlarged portion at its lower end, a first sleeve freely mounted on said shaft and having a first disk concentrically mounted on its upper end, a second sleeve freely mounted over said first sleeve and having a second disk concentrically mounted on its lower end, means for adjusting said first disk along said shaft in relation to said second disk, said first disk having a plurality of radially and outwardly directed spring clips along its periphery, said second disk having thereon a concentrically mounted ring of rubber provided with a plurality of radially outwardly directed slits therein for holding the lower end of a fishing leader while the upper end of the leader is attached to a hook suspended from one of the spring members on said first disk.

3. A trot line setter comprising a bracket adapted to be mounted on a boat and having an outwardly extending arm, a shaft depending from said arm and having an enlarged portion at its lower end, a first sleeve freely mounted on said shaft and having a first disk concentrically mounted on its upper end, a second sleeve freely mounted over said first sleeve and having a second disk concentrically mounted on its lower end, said first disk having a plurality of radially directed hook suspending devices along its periphery, said second disk having a plurality of radially and outwardly directed slots therein for holding the lower end of a fishing leader while the upper end of the leader is attached to a hook suspended from one of said hook suspending devices on said first disk.

4. A trot line setter, a shaft having an abutting portion at its lower end, a first sleeve freely mounted on said shaft and having a first disk concentrically mounted on one end, a second sleeve freely mounted over said first sleeve and having a second disk concentrically mounted on one end opposite said first disk, one of said disks having a plurality of radially directed hook holding devices along its periphery, the other of said disks having therein a plurality of radially and outwardly directed slots therein for holding the one end of a fishing leader while the other end of the leader is attached to a hook suspended from one of the hook holding devices.

5. In a trot line setter, a rotatively mounted member having a plurality of spring clip hook attaching means spaced around one end and a plurality of leader gripping means spaced around its opposite end so that a trot line can be supported about said member with the leaders gripped by said gripping means and the hooks held by said hook attaching means.

6. A rotatively and substantially horizontally positioned member having a plurality of spring clip hook attaching means for supporting hooks of a trot line about said member, gripping means spaced below said hook attaching means for gripping the leaders whereby the hooks can be held by said hook attaching means and the main trot line will hang in loops below the gripping means.

References Cited in the file of this patent

UNITED STATES PATENTS

| | | |
|---|---|---|
| 2,667,010 | Anderson | Jan. 26, 1954 |
| 2,702,442 | Wallen | Feb. 22, 1955 |
| 2,708,326 | Bleckman | May 17, 1955 |

FOREIGN PATENTS

| | | |
|---|---|---|
| 43,015 | Sweden | Aug. 29, 1917 |